United States Patent

[11] 3,579,781

| | | |
|---|---|---|
| [72] | Inventor | Toshio Yaegashi<br>Katsuta, Japan |
| [21] | Appl. No. | 747,153 |
| [22] | Filed | July 24, 1968 |
| [45] | Patented | May 25, 1971 |
| [73] | Assignee | Hitachi, Ltd.<br>Tokyo-To, Japan |
| [32] | Priority | July 27, 1967 |
| [33] | | Japan |
| [31] | | 43/64862 |

[54] SLEEVED ROLL AND METHOD OF MAKING THE SAME
20 Claims, 15 Drawing Figs.

[52] U.S. Cl.................................................. 29/148.4,
29/129, 29/447
[51] Int. Cl..................................................... B23p 11/00,
B23p 11/02
[50] Field of Search............................................ 29/148.4,
148.4 (R), 129, 447, 401

[56] References Cited
UNITED STATES PATENTS

| 1,693,422 | 11/1928 | Adams ........................ | 29/148.4X |
| 3,014,266 | 12/1961 | Samuels et al. ............... | 29/148.4 |
| 3,426,414 | 2/1969 | Iseki et al..................... | 29/129 |
| 3,435,499 | 4/1969 | Rackoff et al. ............... | 29/447X |

*Primary Examiner*—Thomas H. Eagen
*Attorney*—Craig, Antonelli, Stewart and Hill

ABSTRACT: A sleeved roll which comprises a sleeve and an arbor fitted in the sleeve by means of shrink fitting wherein the arbor and the sleeve are, respectively, provided at the opposed end portions thereof with annular grooves into which metal rings having good welding characteristics are tightly fitted, respectively, in such a manner that the metal rings in the sleeve combine with those in the arbor to form a U-shaped annular ring when they are firmly secured to each other by means of deposit metal which has a smooth surface, the radial section of the grooves and the united metal rings having such a contour as to withstand slip between the sleeve and the arbor.

INVENTOR
TOSHIO YAEGASHI

BY Craig, Antonelli, Stewart & Hill

ATTORNEYS

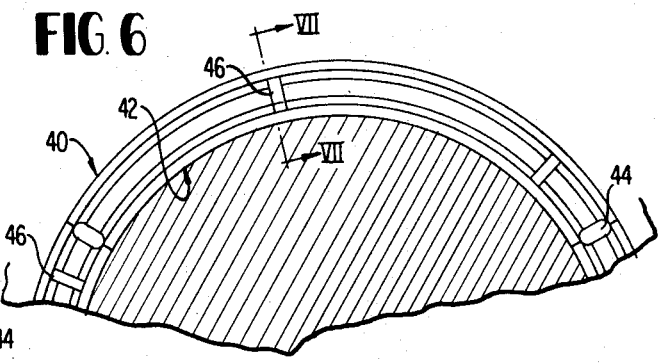
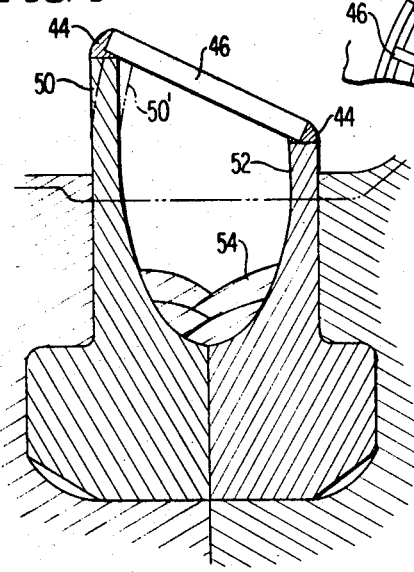
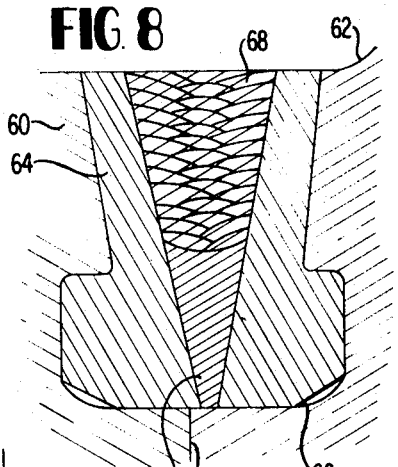
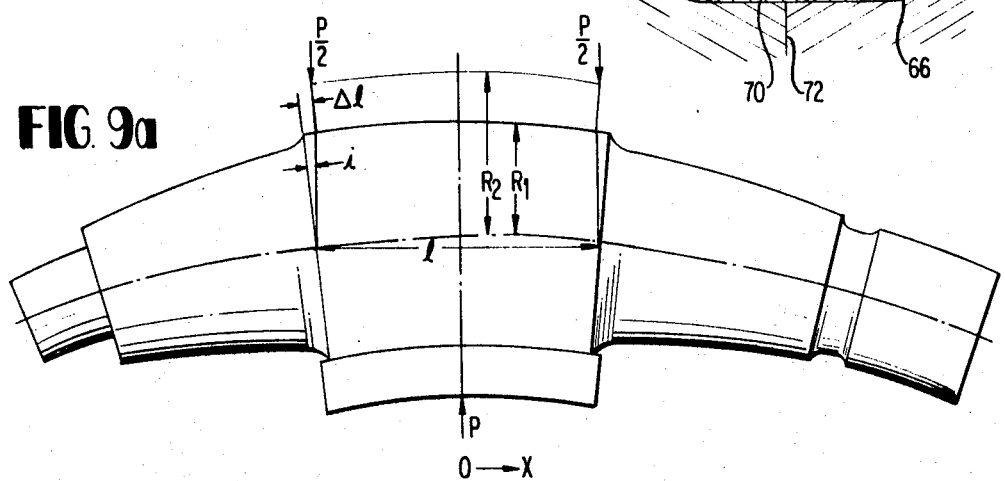
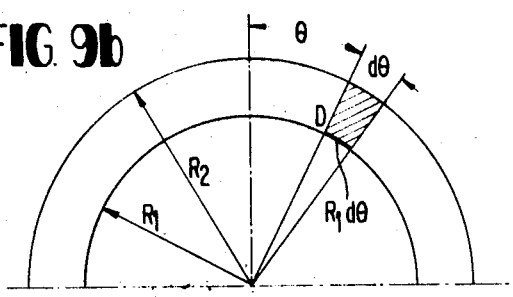
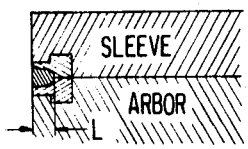

SLEEVED ROLL AND METHOD OF MAKING THE SAME

The present invention relates to an improvement in a sleeved-type roll for use in a mill stand which comprises an arbor portion and a sleeve portion fitted thereonto, and more particularly, to a sleeved-type backup roll which has such a structure as to prevent the occurrence of slip between the sleeve and the arbor and of residual bend of the roll during milling or as a result of milling accidents.

In cold milling, a pair of sleeved backup rolls are generally used to backup a pair of work rolls. One of the advantages of rolls of this type, as compared with one-body-type rolls, is capability of independent selection of a desirable material for the sleeve and the arbor in accordance with practical requirements. As a whole, a sleeved roll of the same mechanical strength can be manufactured more economically than a one-body roll. Another advantage is that since there is no wear of the arbor portion, the sleeved roll is more economical in the long run. When a sleeved roll is worn out, the sleeve portion alone may be replaced by a new one. Furthermore, a sleeve portion may be combined with a worn out one-body roll to make a new sleeved roll.

Various methods for rigidly securing the sleeve to the arbor have been hitherto provided. One of them is the conventional shrink fitting process wherein thermal-fitting or chill-fitting is employed to fix the sleeve onto the arbor. According to this method, however, the sleeve and the arbor have a tendency to slip with respect to each other due to bending of the sleeved roll upon application of a large load during milling work or as a result of milling accidents. This is believed due to nonsufficient fitting stress provided between the sleeve and the arbor. It is further found that the bent roll can not return to the original straight state once slipping occurs between the sleeve and the arbor. As a result, undesirable deformations of the worked strip are caused, accompanying extraordinary milling noises.

The slip is believed to be due to shortage of the shrink fitting margin. If the shrink fitting margin is increased overall, however, the residual bend has a greater tendency to remain, especially when a roll is subjected to unusually large loads due to accidents in the course of milling work. When extremely large loads are applied to sleeve rolls, shearing stresses caused at the boundary of the sleeve and the arbor increase over the friction resistance or the fitting strength, resulting in the occurrence of slipping. Even after the load is released, the deformations of the sleeved rolls do not vanish, but remain as a residual bend, in which a gap between the sleeve and the arbor may be formed. Undesirable milling noises and undesirable deformations of the worked strip thus occur during the milling work when the deformations and gaps of the roll are great.

The slipping has been considered to be reduced in one measure by employment of particular fitting structures for the sleeve and the arbor, such as a overhung structure or a snapring structure. From the practical point of view, however, the residual bend is not reduced or prevented sufficiently according to the above conventional structures. In the other measures, an increase of the shrink fitting margin has been employed. This is found to cause a considerable increase in the tensile residual stress so that accidents such as destruction or breakage of the sleeve are experienced frequently.

Accordingly, one of the objects of the present invention is an improvement is sleeved-type rolls.

Another object of the invention is to provide a sleeved backup roll having new fitting structure and construction, wherein slip between the sleeve and the arbor and residual bend of the roll can be prevented.

Further object of the invention is to provide a new method for making a sleeved roll.

These and other objects and features of the invention will be more apparent from the following description of the preferred embodiments, taken in conjunction with the accompanying drawings.

Figure 1:
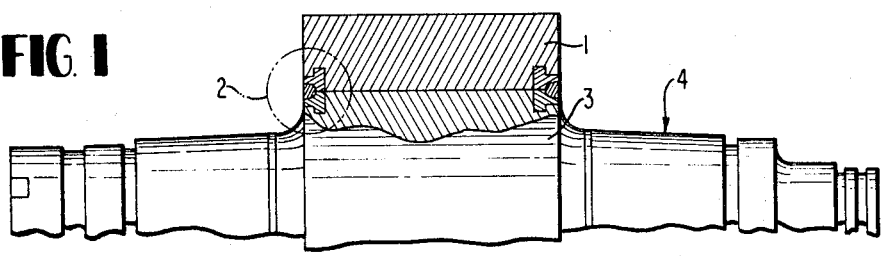
FIG. 1 shows a partial sectional view of a sleeved-type backup roll according to the invention.

FIGS. 5a, 5b, 5c, 5d, 5e, and 5f show various structures of welded portions of the sleeve and the arbor;

FIG. 6 shows a partial plane view of the metal rings fitted in the grooves provided in the sleeved roll;

FIG. 7 shows a welding method for securing the metal rings wherein bends or deformations of the metal rings during the welding operation are prevented;

FIG. 8 shows a sectional view of a welded portion in another embodiment; and

FIGS. 9a, 9b and 9c illustrate an effect of securing the sleeve to the arbor according to the invention.

According to the invention an improved sleeved roll is provided which comprises a sleeve and an arbor fixed in the sleeve by means of shrink fitting, wherein the sleeve and the arbor are secured by welding the metal rings which have been tightly fitted into the grooves provided at the opposed end portions of the arbor and the sleeve.

In one-body backup rolls, neither residual slip nor residual bend occurs until breakage thereof. From the above viewpoint, the slip and bend in the sleeved-type backup rolls may be prevented by making the arbor and the sleeve into a substantially rigid body.

In the present invention, the arbor and the sleeve are secured by inserting and fitting metal rings into grooves each provided at the end portions thereof and then welding the opposed metal rings as shown in the drawings.

In FIG. 1, an arbor 4 is secured to a sleeve 1 on the outer periphery thereof by thermal-shrink fitting or chill-shrink fitting at the central portion 3. Thermal-shrink fitting itself as employed in the invention is conventional, being comprised by the following steps; inserting the arbor held at room temperatures into the sleeve heated to a high temperature so that the sleeve may fit with the portion 3 of the arbor and then allowing the sleeve to cool thereby contracting into a solid fit. Similarly, chill shrink fitting may be carried out by inserting the arbor held at a very cold low temperature such as −50° C. so as to decrease the diameter of the arbor, into the sleeve held at the normal temperature and then heating the arbor so as to tightly fit them to each other.

Though conventional shrink fitting margins are sufficient for the shrink fitting in the present invention, such as about 0.4 to 0.6 millimeters for an arbor of 1000 millimeters thickness, the shrink fitting margins may be additionally increased so as to ensure the desired fitting between the arbor and the sleeve. For example, in the invention the shrink fitting margins of about 0.6 to 0.8 may be employed successfully. In contrast, the shrink margin in the shrink fitting of conventional rolls is limited to a smaller amount under consideration of not only practicable temperatures but also increasing tendency of producing residual bend with increase in the margin. According to the present invention, however, the slip is prevented totally by the welded metal rings in the grooves, there being no fear of the residual bend of the roll, and thus the shrink fitting margin can be increased up to a maximum which will be determined by practicable temperatures to which the sleeve on the arbor is subjected for the shrink fitting.

Figure 2:
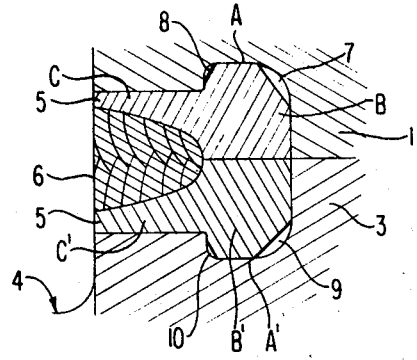
FIG. 2 shows a sectional view of a welded portion outlined in FIG. 1 by the circle 2.

FIG. 2 shows a structure of a welded portion of the arbor 4 and the sleeve 1 in detail, wherein the metal rings 5 and 5' inserted in grooves 7 and 9 are secured by deposit metal 6. When combined together, the annular grooves have a U-shaped cross section or contour which is provided with projections B and B' at the bottom sides thereof. The corners 8 and 10 of the projections have curved surfaces, respectively, so as to avoid any mechanical damage upon application of the shearing stress to the boundary between the sleeve and the arbor. Tight insertion of the metal rings in the grooves having the above cross section provides a resistance against axial slip between the sleeve and the arbor. Especially, projections B and B' prevent the sleeve and the arbor from slipping with respect to each other. Gaps 7, 8 and 9 may be left at the corners of the projections of the metal rings between the sleeve and the metal rings, respectively. However, it is necessary to achieve tight fitting between the grooves and the projections of the metal rings in order to prevent totally the slipping and the residual bend of the roll. Therefore, chill fitting is preferable where the metal rings being cooled are hammered into the annular grooves.

Chill fitting margins between the projections of the metal rings and the hollow of the annular grooves in the axial direction and in the radial direction of the roll should be selected suitably to a proper amount. For example, dry ice may be used as a coolant for the metal rings and as a result thereof the metal rings are cooled to about −50° C. Preferable chill fitting margins in the radial direction of the projections and the grooves are in a range of about 2 to 5 millimeters for metal rings of 100 millimeters thickness. Especially, about 4 to 5 millimeters of the chill fitting margin are more preferable if the metal rings are cooled to the extent of about −50° C. or more.

Figure 3:
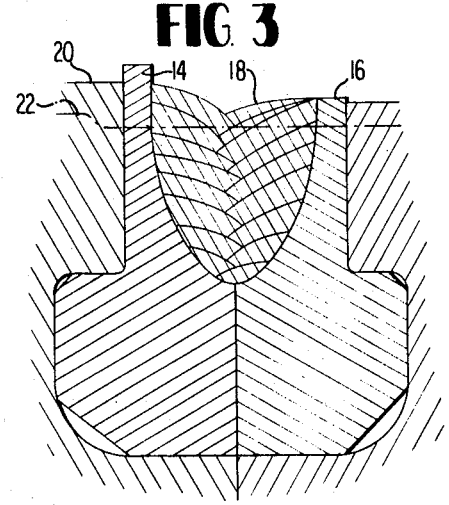
FIG. 3 shows a sectional view of a preworking welded portion, that is; a structure prior to being formed into a desired shape for the roll.

FIG. 3 shows a detailed structure of the welded portion just after the metal rings are welded wherein the metal rings 14 and 16 are welded and secured tightly by deposit metal 18. Then the surface 20 is cut and ground to be formed into a desired shape as shown by a broken line 22.

Figure 4:
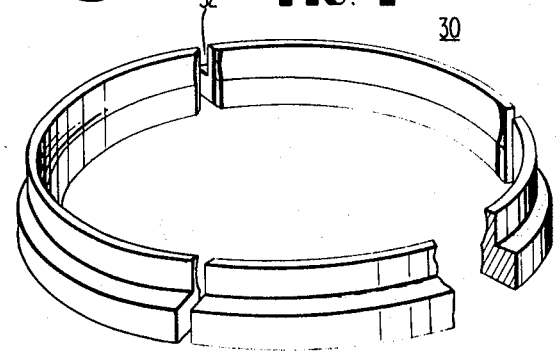
FIG. 4 shows a perspective view of a metal ring to be inserted and fitted into grooves each provided at the opposed end portions of the arbor and the sleeve.

FIG. 4 shows a metal ring divided into three parts so as to be inserted easily into the groove. For the fitting operation, the metal ring to be inserted into the groove of the sleeve should be divided into at least three parts, and the other metal ring to be inserted into the groove of the arbor should be divided into at least two parts. The metal rings must have good weldability so as to eliminate the need for or simplify preheating and/or postheating at high temperatures. Therefore, preferably, the metal rings are made of mild steel, high tensile steel having less than about 60 kg./mm.² of tensile strength or other steels having an austenitic structure such as 18 Cr 8Ni stainless steel or 17 Cr– 7Ni steel, or the like. The above cited materials are capable of being welded without hardening of the welding heat affected zone, even if preheating at high temperature is not employed.

The degrees of hardening of the heat affected zone is varied in dependence upon cooling conditions of the welded portion if the welding conditions are identical. When a hardening effect of alloying elements on a given steel is referred to by the equivalence of carbon (Ceq), the relationship of Ceq and the alloying elements is given as follows:

$$Ceq = C + Mo/6 + Ni/15 + Cr/5 + Mo/4V/5 \quad (1)$$

or $$Ceq = C + Mn/6 + Ni/15 + Cr/15 + Mo/4Cu/13 \quad (2)$$

The relationship between Ceq and the maximum hardness of welding heat affected zone Hmax is as follows:

$$Hmax = 1200 \times Ceq - 200 Hv \quad (3)$$

wherein Hv is Brinell-Vickers hardness.

From the foregoing, the maximum hardness Hmax of the heat affected zone is related to the preheating and postheating as follows;

Hmax < 200Hv Pre- and postheating are unnecessary.
Hmax 200 to 250 Hv It is preferable to employ pre- and postheating.
Hmax 250 to 325 Hv Preheating at above 150° C., and postheating at 650° C. are necessary.

Hmax may not be determined solely by equations 1 and 2 in actual cases, since Hmax is apt to change according to the mass of the sleeved roll and welding conditions. Therefore, it is practicable to determine heat treating conditions, taking into account actual hardness of the heat affected zone. In practice, the materials for metal rings are selected in consideration of the hardness of the heat affected zone thereof as a standard. That is, the material is selected from a group of materials which have a hardness less than 250 Hv. Any material which requires preheating or postheating at high temperature to avoid residual stress in the welded portion is not suitable for the metal rings from the economical and technical points of view. For the above reasons, mild steel and high tensile steel having tensile strength less than about 60 kg./mm.², particularly from about 40 to 55 kg./mm.², is most suitable for the metal rings. For example, the following mild steel materials are used preferably for the metal rings;

| | Percent | | | | |
|---|---|---|---|---|---|
| | C | Si | Mn | P | S |
| (1) | 0.06~0.09 | 0.30> | 0.50> | 0.045 | 0.045 |
| (2) | 0.19 | 0.30> | 0.50> | 0.045> | 0.040 |
| (3) | 0.15 | 0.30> | 0.60> | 0.060> | 0.060 |
| (4) | 0.15~0.25 | 0.35 | 0.60> | 0.060> | 0.060 |

In general, the preferable materials used for the metal rings comprise carbon of about 0.04 to 0.3 percent by weight, silicon of less than about 0.04 percent by weight, manganese of less than about 0.65 percent by weight, and iron of residual balance and a small amount of accompanying impurities. After insertion of the metal rings, the divided metal rings are connected to each other by welding at portion 32.

In the present invention, filler metal for welding is preferably a material of the same group as the metal rings from the above technical point of view. For example, when the metal rings are made of mild steel, mild steel filler metal is suitable for welding. Since shearing stress due to a load does not act on the metal rings, but on the deposit metal, the annular metal rings are not required to be of a particular tensile strength. It is sufficient that the metal rings only have mechanical strength enough to overcome the breakage or destruction owing to tension. For example, tensile strength of the metal rings from about 40 to 55 kg./mm.² is sufficient.

On the other hand, the depth and width of the deposit metal in the hollow or open end provided in the metal rings govern the mechanical strength of the welded portions, especially the depth thereof. According to investigations carried out, when the maximum total milling load is at most about 2700 tons, the depth may be required to be more than about 25 millimeters wherein the length of the sleeve is about 2000 millimeters, the diameter of the arbor is about 1500 millimeters, and the thickness of the sleeve is about 100 millimeters.

In general, the roll of the invention may be designed and manufactured by employing the following values as standards;

a. depth of the grooves in the axial direction of the roll
   about 45 to 100 millimeters, especially, about 50 to 80 millimeters.
b. depth of the deposit metal in the hollow of the metal rings
   about 20 to 50 millimeters, especially, about 25 to 40 millimeters.
c. thickness of the projections of the metal rings in the axial direction of the roll
   about 20 to 50 millimeters, especially, about 25 to 40 millimeters.
d. width of the shoulders of the projections of the metal rings
   about 3 to 10 millimeters, especially, about 4 to 7 millimeters.

FIGS. 5a, 5b, 5c, 5d, 5e and 5f show various structures of welded portions. As described in the foregoing description, welding is employed to secure the metal rings to each other and the welded metal rings have such a contour in the radial cross section to prevent slipping between the sleeve and the arbor and thereby residual bend is avoided entirely even if they may happen to bend due to a large load. For this purpose, various shapes or contours of grooves and the metal rings may be employed as shown in FIGS. 5a to 5f.

Figure 5A:
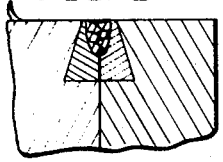
Figure 5B:
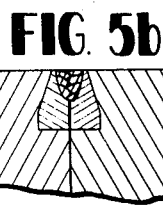
Figure 5C:
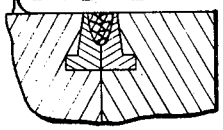

FIGS. 5a, 5b and 5c show three different structures of the combined grooves and the welded metal rings according to the invention, wherein the annular combined grooves are of dovetail structure or are tapered to be narrower at the open end than the bottom thereof. Thus, slipping is prevented by the tapered portion of the metal rings if the large loads or large shearing stresses are applied to the sleeve and the arbor during the milling or at the accidents.

Figure 5D:
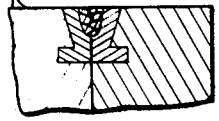

FIG. 5d shows another welded structure wherein the contour in the cross section of the combined grooves is open-tapered and has a projection at the bottom so that slipping is prevented.

Figure 5E:
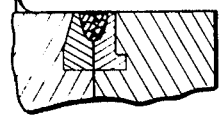

FIG. 5e shows another example, wherein the contour of the cross section of one of the grooves is tapered like half of the dovetail structure but does not have any projection, and the other grooves is not tapered but has a projection. Needless to say, the metal rings inserted and tightly fitted into the grooves have similar sectional shapes on contours to be fixed in the grooves.

Figure 5F:
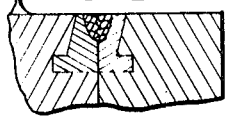

FIG. 5f shows still another example, wherein the sectional shape of the groove of the arbor side is dovetail tapered, and of the sleeve side is open-tapered with a projection at the bottom.

During welding of the metal rings inserted in the grooves, the annular projecting portions 50 and 52 of the metal rings 40 and 42 may be supported by welded fetters 46 so as to prevent deformation or bending thereof as shown in FIG. 6 and FIG. 7, in which the fetters 46 and the annular projecting portions 50 and 52 of the metal rings are secured by deposit metal 44. The projecting portions 50 and 52 will be deformed and bent as shown by a broken line 50' if the fetters are not used because of the shrinkage of the deposit metal while being cooled. Also, peening of the deposit metal in every layer may be employed during welding so as to reduce the shrinkage of the deposit metal by spreading thereof.

A special structure of the welded portion of the roll is shown in FIG. 8, wherein the grooves are formed between sleeve 60 and arbor 62, and metal rings 64 and 66 are fitted in the grooves. A supplemental member 70 made of metal is inserted between the metal rings. After the insertion of the supplemental member the metal rings are secured by welding. It is undesirable that the boundary of the metal rings and supplemental member be on a level with boundary 72 of the arbor and the sleeve, because the mechanical strength of the welded portions may be reduced. Therefore the bottom boundary of the metal rings and the supplemental member is positioned above the boundary 72 as shown in the drawing.

This structure may be also employed in the case of repair or reproduction of an inferior sleeved roll or a worn-out sleeved roll without pulling out of the sleeve from the arbor. These rolls to be repaired or reproduced are first cut and machined to provide a U-shaped groove, then two metal rings are inserted and fitted into the groove, and the supplemental member is inserted between the metal rings. After insertion of the metal rings and the supplemental member, the metal rings are welded as shown in FIG. 8.

Welding methods, such as hand-operation arc welding, heli-arc welding, and union-melt welding may be employed in accordance with the invention. The peening is applied at every layer of about 2 to 5 millimeters of deposit metal.

FIG. 9a shows an explanatory drawing of the sleeved roll which is bent, for example, during a milling accident, FIG. 9b shows explanatorily a partial vertical sectional view of the sleeved roll according to the invention, and FIG. 9c shows a partial sectional view of the sleeved roll manufactured according to the invention. When the body portion of the arbor of the normal length $l$ is bent by a load, the end portion of the sleeve is caused to slip by the discrepancy angle $i$. If the length of the sleeve returns to the normal length, a discrepancy $\Delta l \cos \theta$ will occur at a given point $\Delta$ on the periphery between the sleeve and the arbor, wherein $\Delta l$ is a gap between the extended body portion of the arbor and the sleeve.

The occurrence of the gap and the discrepancy may be prevented by making the sleeve extend with the extension of the arbor. This is done by fixing the sleeve and the arbor rigidly. A force required to extend the sleeve at a given point on the periphery is more than $F_\theta$, wherein $F_\theta$ is a force which is a function of $\theta$. At the points $\theta = 0$ and $\pi$, the force $F_\theta$ is the maximum.

On the other hand, when the shearing strength at the welded portions is $\tau y$, the shearing strength $W_1$ per unit angle in the axial direction is as follows;

$$W_1 = \tau y \cdot L \cdot R_1 \cdot d\theta \qquad (4)$$

A slip resistance force $W_1$ in the axial direction of the roll which is manufactured by shrink fitting is as follows;

$$W_2 = \rho \cdot \mu \cdot P\left(\frac{l}{2} - L\right) R_1 \cdot d\theta \qquad (5)$$

wherein $\rho$ is the shrink fitting margin efficiency, $\mu$ is the friction coefficient, $p$ is a resistive force due to shrink fitting, and $l$ is a normal length of the sleeve.

Accordingly, the value of $F_\theta$ max is compared with that of $W_1 + W_2$. A bending moment Mx due to the concentrated load P at the center of the sleeve is:

$$Mx = \left[\frac{Pl}{4} - \frac{P}{2}x\right] \qquad (6)$$

wherein $x$ is a given distance from the center of the sleeve.

The discrepancy angle $i$ is shown as follows:

$$i = -\int_0^{\frac{l}{2}} \frac{Mx}{EI} dx = -\frac{1}{EI} \int_0^{\frac{l}{2}} \left(\frac{Pl}{4} - \frac{Px}{2}\right) dx = -\frac{Pl^2}{16EI} \qquad (7)$$

wherein E is the modulus of elasticity of steel ($2.1 \times 10^4$ kg./mm.$^2$), $I$ is the geometrical moment of inertia i.e., $$I = \frac{\pi}{4} R_2^4$$

Since $\Delta l = R_1 i$, the amount of stress is $2\Delta l/l$ and the stress is $2\Delta l \cdot E/l$, and a sectional area per unit angle $d\theta$ of the sleeve is $$\frac{R_2^2 - R_1^2}{2} d\theta$$

Therefore; the force $F_\theta$ which extends the sleeve to prevent the occurrence of slipping and other discrepancy is shown as follows;

$$F_\theta = \frac{-R_1(R_2^2 - R_1^2) P \cdot l \cdot \cos \theta d\theta}{4\pi R_2^4} \qquad (8)$$

The absolute value of $F_\theta$ is maximum when $\theta = 0$ and $\pi$, and $F_\theta$ max is, $$F_{\theta\ max.} = \pm \frac{-R_1(R_2^2 - R_1^2) Pl \cdot d\theta}{4\pi R_2^4} \qquad (9)$$

Accordingly, the total force for a semicircle of the sleeve is, $$\int_{-\frac{\pi}{2}}^{\frac{\pi}{2}} F_\theta = \frac{-R_1(R_2^2 - R_1^2) Pl}{2\pi R_2^4} \qquad (10)$$

When $R_2$ is 711 millimeters, $R_1$ is 511 millimeters, and $l$ is 3022 millimeters, $$F_\theta\ max = 0.081 P \cdot d\, d\theta \text{ (kg./rad)} \qquad (11)$$

From the equation 4, $$\tau y = \frac{1}{2}\tau = \frac{1}{2} \cdot \frac{(T \cdot S)}{\sqrt{3}} \qquad (12)$$

wherein T.S is tensile strength. Since shearing yield strength is one half of shearing strength, the shearing strength is $1\sqrt{3}$ of tensile strength, and the tensile strength of mild steel T.S is about 50 kg./mm.$^2$, $\tau y = 14.4$ kg./mm.$^2$, when L is about 30 millimeters and $W_1 = 2.21 \times 10^5 dak$ (kg./rad).

Concerning $W_2$ which is defined by equation 5, wherein $\rho$ is about 1 since the carborundum and the like is coated on the inner surface of the sleeve, $\mu$ is about 0.25. When the shrink fitting margin $\delta$ is 0.75/1000, the following result is obtained from $$P = \frac{1}{2} E\delta \left(1 - \frac{R_1^2}{R_2^2}\right)$$

$W_2 = 4.79 \times 10^5 d\theta$ (kg./rad)

By combining the above results, $$W_1 + W_2 = 7.00 \times 10^5 \theta \qquad (13)$$

From equations (11) and (13) an allowable load for the sleeve roll is introduced as follows;

$$P = \frac{7.00 \times 10^5}{0.081} = 8.64 \times 10^6 \text{ (kg.)} = 8640 \text{ (tons)}$$

Since the maximum load during milling operation is 2700 tons in the case of the above described exemplary embodiment and far less than the allowable load as pointed out above, the sleeved roll can be used without any occurrence of residual bend.

A part of the total resistance force in the improved sleeved roll according to the invention is supported by the welded portion.

$$P \text{ weld} = \frac{2.21 \times 10^5}{0.081} = 2730 \text{ (tons)}$$

On the other hand, when the welding is not employed the shrink fitting portion supports a force as follows;

$$W_2 = \rho \cdot \mu \cdot P \frac{l}{2} \cdot R_1 d\theta$$
$$= 3.42 \times 10^5 d\theta$$

wherein the shrink fitting margin is 0.65/1000, and $\rho$ is about 0.8, and thus $$P = \frac{3.42 \times 10^5}{0.081} = 4220 \text{ (tons)}$$

Accordingly, merely shrink fitting cannot support large loads and cannot prevent slipping between the arbor and the sleeve.

From the foregoing, it will be apparent that in a sleeved type roll according to the invention, slipping as well as the residual bend due to the large loads can be effectively prevented during milling or even during accidents.

While preferred embodiments have been disclosed herein, it will be apparent that many modifications thereof are feasible without departing the spirit of the invention and it is intended that they are covered by the appended claims.

I claim:

1. A sleeved roll comprising an arbor having a body portion and a sleeve secured to the body portion of the arbor by shrink fitting, the improvement being characterized by the provision on the opposed end portions of the sleeve and the body portion of the arbor of respective annular grooves forming an annular channel, first and second metal rings of a metal having good welding characteristics shrink-fitted tightly in respective opposed annular grooves and, deposit metal securing the first and second metal rings to each other and having a smoothed surface, said rings and the grooves within which they are mounted being contoured to lock said rings against slipping axially towards the ends of the sleeve and body portion of the arbor.

2. A sleeved roll according to claim 1 wherein at least one of said first and second rings has an annular axial projection locking with a corresponding recess in the groove into which it is fitted to prevent slipping of said ring from its groove.

3. A sleeved roll according to claim 2, wherein said annular projection has curved corner surfaces so as to avoid reduction of the shearing strength of the sleeve and the arbor.

4. A sleeved roll according to claim 2, wherein the annular channel provided in the opposed end portions of the sleeve and the arbor has a substantially U-shaped cross section.

5. A sleeved roll according to claim 4, wherein the combined annular metal rings fitted in the annular grooves forming the annular channel have a substantially U-shaped cross section.

6. A sleeved roll according to claim 1, wherein the metal rings have a tensile strength of from about 35 to 60 kg./mm.$^2$.

7. A sleeved roll according to claim 1, wherein the metal rings have a tensile strength of from about 40 to 55 kg./mm.2.

8. A sleeved roll according to claim 1, wherein the metal rings are made of a material selected from a group consisting of mild steel and high tensile steel having a tensile strength less than about 60 kg/mm$^2$.

9. A sleeved roll according to claim 1, wherein the deposit metal is formed of the same basic material as that of the metal rings.

10. A sleeved roll according to claim 1, wherein at least one of the annular grooves has dovetail tapered structure being narrower at the mouth than at the base to resist against slipping between the arbor and the sleeve.

11. A sleeved roll according to claim 10, wherein one of the opposed metal rings has an annular axial projection locking with a corresponding recess in the groove into which it is fitted.

12. A sleeve roll according to claim 10 wherein both annular grooves have a dovetail tapered configuration.

13. A sleeve roll according to claim 10 wherein the other groove has a radial configuration and an axial recess at the base thereof, the ring fitted in said other groove having an axial projection fitted in said axial recess.

14. A sleeve roll according to claim 1 wherein said first ring is formed of three parts secured to one another and said second ring is formed of two parts secured to one another.

15. A sleeve roll according to claim 1 wherein said first and second rings are made of a metal selected from a group consisting of mild steel and high tensile steel having a hardness less than 250 H$v$.

16. A method of making a sleeved-type roll which comprises the steps; forming grooves at the opposed end portions of the arbor and the sleeve respectively; inserting tightly metal rings having annular axial projections into the respective grooves by shrink fitting; fitting tightly the sleeve onto the arbor by means of shrink fitting; welding the opposed metal rings so as to secure them to each other; and cutting the surface of the welded portion securing the rings together in order to obtain a predetermined shape for the roll.

17. The method according to claim 16, wherein the sleeve and the arbor are fitted by means of thermal-shrink fitting with a shrink fitting margin in a range of about 0.5 to 0.8 millimeters for the sleeve of 1000 millimeters thickness.

18. The method according to claim 16, wherein the metal rings are inserted by means of chill fitting into the annular grooves with a shrink fitting margin in a range of about 2 to 10 millimeters for the metal rings of 100 millimeters thickness.

19. The method according to claim 16 wherein the step of welding includes supporting the rings with welding fetters to prevent deformation of the rings.

20. The method according to claim 19 wherein the step of welding additionally includes peening the welding material at every layer of about 2 to 5 millimeters thereof.